(12) United States Patent
Ikushima (10) Patent No.: US 7,510,103 B2
(45) Date of Patent: Mar. 31, 2009

(54) DEVICE FOR DELIVERING FIXED QUANTITY OF LIQUID

(75) Inventor: Kazumasa Ikushima, Mitaka (JP)

(73) Assignee: Musashi Engineering, Inc., Tokyo (JP)

( * ) Notice: Subject to any disclaimer, the term of this patent is extended or adjusted under 35 U.S.C. 154(b) by 406 days.

(21) Appl. No.: 10/480,831

(22) PCT Filed: Jun. 14, 2002

(86) PCT No.: PCT/JP02/05970

§ 371 (c)(1),
(2), (4) Date: Aug. 10, 2004

(87) PCT Pub. No.: WO02/103202

PCT Pub. Date: Dec. 27, 2002

(65) Prior Publication Data

US 2005/0063839 A1 Mar. 24, 2005

(30) Foreign Application Priority Data

Jun. 16, 2001 (JP) ............................. 2001-220621

(51) Int. Cl.
- G01F 11/06 (2006.01)
- G01F 11/00 (2006.01)
- B67D 3/00 (2006.01)
- F04B 35/04 (2006.01)

(52) U.S. Cl. ...................... 222/504; 222/250; 222/310; 222/506; 222/278; 417/418

(58) Field of Classification Search ................... 222/61, 222/63, 135, 216, 249, 250, 275, 278, 310, 222/318, 319, 320, 333, 335, 504, 481, 506; 417/43, 313, 41, 418, 415

See application file for complete search history.

(56) References Cited

U.S. PATENT DOCUMENTS 3,411,525 A * 11/1968 Auger ........................ 137/270

(Continued)

FOREIGN PATENT DOCUMENTS

DE 19942867 3/2000

(Continued)

*Primary Examiner*—Kevin P Shaver
*Assistant Examiner*—Melvin A Cartagena
(74) *Attorney, Agent, or Firm*—Westerman, Hattori, Daniels & Adrian, LLP.

(57) ABSTRACT

To deliver a liquid at high speed and with high accuracy. A device for delivering a fixed quantity of liquid, comprising a pump section for metering the delivered liquid to provide a desired amount consisting of a plunger chamber formed in a cylinder block, and a plunger reciprocating in the plunger chamber, a valve section for switching between liquid flow channels for suction and delivery, a reservoir section for reserving liquid adapted to communicate with the pump section depending upon the position of the valve section, and a delivery section having a delivery port for delivering liquid, the device being characterized in that the pump section and the valve section are disposed connected to each other and that the maximum advance position of the plunger is defined by a plane where the front end surface of the plunger contacts the valve section and pump section. The valve section is removably disposed in the pump section. The plunger chamber is made of a cylindrical chamber fitted in a hole formed in the cylinder block. The valve section is in the form of a switching valve provided with a valve block having a first flow channel communicating with a reservoir vessel and a second flow channel communicating with the delivery section.

17 Claims, 4 Drawing Sheets

U.S. PATENT DOCUMENTS

| | | | |
|---|---|---|---|
| 3,597,113 A * | 8/1971 | Dumoulin et al. | 417/53 |
| 3,864,069 A * | 2/1975 | Takiura et al. | 425/131.1 |
| 4,411,601 A | 10/1983 | Hersom et al. | 417/388 |
| 4,436,230 A * | 3/1984 | Hofmann | 222/614 |
| 4,722,830 A * | 2/1988 | Urie et al. | 422/62 |
| 5,114,314 A | 5/1992 | Fujimoto | 417/3 |
| 5,975,374 A * | 11/1999 | Vargas et al. | 222/252 |
| 6,186,747 B1 | 2/2001 | Zhou et al. | |
| 6,244,838 B1 | 6/2001 | Couillard et al. | 417/426 |

FOREIGN PATENT DOCUMENTS

| | | |
|---|---|---|
| EP | 334994 | 10/1989 |
| GB | 2089440 | 12/1980 |
| JP | 49-93930 | 9/1974 |
| JP | 56-35570 | 8/1979 |
| JP | 35570 | 4/1981 |
| JP | 63-2617 | 1/1988 |
| JP | 64-4873 U | 1/1989 |
| JP | 6-27161 | 7/1994 |
| JP | 07-35051 A | 2/1995 |
| JP | 7-280787 | 10/1995 |
| JP | 8-93637 | 4/1996 |
| JP | 11-28410 A | 2/1999 |
| JP | 11-511830 A | 10/1999 |
| JP | 11-324905 | 11/1999 |
| JP | 2001-227456 | 8/2001 |

* cited by examiner

DEVICE FOR DELIVERING FIXED QUANTITY OF LIQUID

TECHNICAL FIELD

The present invention relates to a device for delivering liquids having any level of viscosity at high speed and with high precision, the liquids ranging from low-viscous materials, e.g., water and alcohol, to high-consistence fluids, such as an adhesive and pasty or creamy industrial materials.

BACKGROUND ART

Hitherto, various types of devices for delivering a fixed quantity of liquid have been developed; for example, (1) an air type delivering device in which compressed air is applied under regulated pressure to a liquid in a reservoir vessel for a predetermined time such that a desired amount of liquid is delivered through a delivery port at a nozzle fore end, (2) a plunger type delivering device in which a plunger is liquid-tightly disposed with respect to a liquid in a reservoir vessel and is moved to pressurize the liquid such that a desired amount of liquid is delivered through a delivery port at a nozzle fore end, and (3) a multi-plunger pump type delivering device having a mechanism in which a cylinder is disposed between a reservoir vessel and a nozzle, a plurality of penetration holes are formed in the cylinder and receive plungers in a one-to-one relation to be able to advance or retreat, and the liquid is sucked into the cylinder from the reservoir vessel with the retreat of the plunger and is delivered from the cylinder to the nozzle with the advance of the plunger, the plurality of plungers acting upon the liquid in sequence to pressurize the liquid such that a desired amount of liquid is delivered through a delivery port at a nozzle fore end.

DISCLOSURE OF THE INVENTION

However, those prior-art devices cannot deliver the liquid in a short tact time demanded at the present, while maintaining high precision and fixed quantity.

In the die-bonding process in manufacture of semiconductors, for example, it is demanded to deliver a larger amount of liquid in a shorter time to be adapted for not only the advent of semiconductor devices having higher performance and larger sizes, but also for a higher tack required to increase productivity. On the other hand, high-precise delivery and fine coating of the liquid are demanded corresponding to requirements for high-quality products.

From the viewpoint of satisfying those demands, any of the above-mentioned prior-art devices has problems given below.

In the air type delivering device of above (1), for example, air pressure is utilized as a pressure source for delivering the liquid. However, because the air pressure is highly compressible, it is very difficult to greatly change the air pressure in a short time. Accordingly, the air type delivering device is not suitable for delivering the liquid at a high tact.

Also, in the case requiring a high pressure to be applied to the liquid, such as when a large amount of liquid should be delivered in a short time and, particularly, when the liquid to be delivered is a highly viscous liquid, an abrupt pressure change is required in the reservoir vessel. This raises a problem that there is a limit in cutting down the delivery time and the liquid cannot be delivered at a high tact.

In the plunger type delivering device of above (2), the plunger liquid-tightly disposed in the reservoir vessel at a level near the liquid head pressurizes all of the reserved liquid and delivers it. Here, because the amount of pressurized liquid depends upon the amount of liquid remaining in the reservoir vessel, the time required for pressurizing the liquid until reaching a desired pressure becomes shorter when the amount of the remaining liquid is small and longer when the amount of the remaining liquid is large. Thus, the pressure change generated with the delivery differs depending upon the amount of liquid remaining in the reservoir vessel, and hence causes a problem of variations in the amount of the delivered liquid.

If the amount of the reserved liquid is set to be small in advance, the reservoir vessel must be replaced at a shorter period, which results in a problem that the work efficiency deteriorates.

In the multi-plunger pump type delivering device of above (3), a plurality of plungers are successively operated in sequence to pressurize the liquid. Upon a shift of control from one plunger to another, therefore, the liquid is pressurized by two plungers at the same time and therefore forces applied to the liquid are not uniform. This causes a problem that a pulsation occurs in the delivered liquid and the flow speed of the delivered liquid is not uniform.

Accordingly, when that type of device is employed to coat the liquid on a workpiece for drawing a line, a variation and a distortion occur in width and height of the line, and a uniform coating pattern cannot be formed. This means that, when drawing a very fine pattern, it is practically impossible to form the pattern by coating the liquid with the device.

It is an object of the present invention to provide a delivering device, which can overcome the above-mentioned problems with techniques for delivering a fixed amount of liquid at high speed and with high precision, and can deliver the liquid at high speed and with high precision.

The present invention resides in a device for delivering a fixed quantity of liquid, comprising a pump section for metering the delivered liquid to provide a desired amount, the pump section being consisted of a plunger chamber formed in a cylinder block and a plunger reciprocating in the plunger chamber, a valve section for switching between liquid flow channels for suction and delivery, a reservoir section for reserving the liquid and being communicable with the pump section depending upon the position of the valve section, and a delivery section having a delivery port for delivering the liquid, the device being characterized in that the pump section and the valve section are disposed in an intimately joined relation and that a maximum advance position of the plunger is defined by a plane where a fore end surface of the plunger contacts the valve section and the pump section.

The valve section is in the form of a switching valve including a valve block provided with a first flow channel communicating with a reservoir vessel and a second flow channel communicating with the delivery section. In this case, the present invention resides in a device for delivering a fixed quantity of liquid, comprising a pump section for metering the delivered liquid to provide a desired amount, a valve section for switching between liquid flow channels for suction and delivery, a reservoir section for reserving the liquid and being communicable with the pump section depending upon the position of the valve section, and a delivery section having a delivery port for delivering the liquid, the device being characterized in that the pump section is constituted by a cylinder block in which a cylinder provided with a plunger is formed, that the valve section is in the form of a switching valve including a valve block provided with a first flow channel communicating with a reservoir vessel and a second flow channel communicating with the delivery section, and that the pump section and the valve section are disposed in an intimately joined relation.

The switching valve is a sliding switching valve. In this case, the present invention resides in a device for delivering a fixed quantity of liquid, comprising a pump section for metering the delivered liquid to provide a desired amount, a valve section for switching between liquid flow channels for suction and delivery, a reservoir section for reserving the liquid and being communicable with the pump section depending upon the position of the valve section, and a delivery section having a delivery port for delivering the liquid, the device being characterized in that the pump section is constituted by a cylinder block in which a cylinder provided with a plunger is formed, that the valve section is in the form of a sliding switching valve including a valve block provided with a first flow channel communicating with a reservoir vessel and a second flow channel communicating with the delivery section, and that the pump section and the valve section are disposed in an intimately joined relation.

The pump section and the valve section are disposed in an intimately joined relation by arranging the cylinder block and a valve block in close and slide contact with each other. In this case, the present invention resides in a device for delivering a fixed quantity of liquid, comprising a pump section for metering the delivered liquid to provide a desired amount, a valve section for switching between liquid flow channels for suction and delivery, a reservoir section for reserving the liquid and being communicable with the pump section depending upon the position of the valve section, and a delivery section having a delivery port for delivering the liquid, the device being characterized in that the pump section is constituted by a cylinder block in which a cylinder provided with a plunger is formed, that the valve section is in the form of a sliding switching valve, unidirectional rotary switching valve, or reciprocating rotary switching valve having a smooth sliding surface, each of the switching valves including a valve block provided with a first flow channel communicating with a reservoir vessel and a second flow channel communicating with the delivery section, and that the pump section and the valve section are disposed in an intimately joined relation by arranging the cylinder block and a valve block in close and slide contact with each other.

BEST MODE FOR CARRYING OUT THE INVENTION

In a method of delivering a fixed quantity of liquid by sucking a liquid from a reservoir vessel into a plunger chamber with a retreat stroke of a plunger and discharging the liquid from the plunger chamber to a nozzle with an advance stroke of the plunger, the method is featured in that one delivery cycle is carried out by one sucking operation and one discharging operation of the plunger. The liquid is never pressurized by a plurality of plungers at the same time and therefore the pressing force applied to the liquid is kept constant. Accordingly, a pulsation does not occur in the delivered liquid and the flow speed of the delivered liquid is kept uniform. As a result, even in the case of coating the liquid on a workpiece for drawing a line, neither variation nor distortion occur in width and height of the line, and a uniform coating pattern can be formed. Thus, a very fine pattern can be formed by coating the liquid with the device. Further, since one delivery cycle is performed by one movement stroke of the plunger, the delivered liquid is subjected to no pulsation and the liquid can be delivered at a constant flow speed. Hence, the liquid can be uniformly and finely coated in a desired drawing pattern with high precision.

The term "delivery" means a phenomenon that the liquid is forced to flow out through the nozzle under a pressure difference between the pressure induced by pressurizing the liquid and the atmospheric pressure. In order to effectively induce the pressure difference, therefore, the volume of liquid to be pressurized is preferably as small as possible. The necessary least volume of pressurized liquid enables the liquid pressure to quickly rise and is effective when delivering a large amount of liquid for a short time, particularly when the liquid to be delivered is a highly viscous liquid. For that reason, it is more preferable to suck the liquid in amount corresponding to one delivery cycle into the plunger chamber and pressurize the sucked liquid than to pressurize the liquid in amount corresponding to plural delivery cycles. More preferably, there is no liquid remaining in the plunger chamber after the plunger has ended the operation of discharging the liquid. According to the present invention, since the liquid in amount delivered in one cycle is sucked into the plunger chamber and the sucked liquid in the plunger chamber is delivered under pressure applied upon movement of the plunger, the liquid to be pressurized can be minimized, and hence adverse influences caused by the excessive amount of liquid can be effectively eliminated. Further, it is possible to greatly cut down the time from the pressurization of the liquid to the delivery of the liquid through the nozzle, and to realize the delivering operation at high speed.

Here, the liquid suction start position and the liquid discharge end position of the plunger are preferably held the same in each delivery cycle. Keeping always constant the amount of liquid to be pressurized in each delivery cycle results in the following advantages. The amount of liquid to be pressurized does not depend upon the amount of liquid remaining in the reservoir vessel, and the process in increasing the liquid pressure when the plunger pressurizes the liquid for delivery can be made identical in each delivery cycle. Hence, no variations are caused in the amount of the delivered liquid depending upon the amount of liquid remaining in the reservoir vessel. More preferably, the liquid delivery start position of the plunger is kept the same in each delivery cycle, and the liquid delivery end position of the plunger is kept the same in each delivery cycle. With the liquid delivery start and end positions of the plunger always kept the same in each delivery cycle, the degree by which the liquid is compressed can be always held constant without depending upon the amount of liquid reserved in the reservoir vessel, and the liquid can be stably delivered with high precision. Even more preferably, the liquid suction start position of the plunger is kept the same in each delivery cycle, and the liquid suction end position of the plunger is kept the same in each delivery cycle.

As a practical construction, a device for delivering a fixed quantity of liquid comprises a nozzle for delivering the liquid, a reservoir vessel for reserving the liquid, a cylinder block having a cylinder chamber formed in it, a plunger advancing and retreating while contacting an inner wall of the plunger chamber, drive means for driving the plunger, and a switching valve for communicating the plunger chamber with the reservoir vessel or the nozzle. In the device thus constructed, the plunger coupled to the drive means is operated to advance and retreat while contacting an inner wall of the plunger chamber. Specifically, the plunger is operated to retreat by a distance corresponding to the amount of liquid to be delivered, thereby sucking the liquid from the reservoir into the plunger chamber, and the plunger is operated to advance by the distance corresponding to the amount of liquid to be delivered, thereby discharging the liquid from the plunger chamber to the nozzle for delivery of the liquid through the nozzle. On that occasion, when the plunger is operated to retreat for sucking the liquid into the plunger chamber, the switching valve communicates the plunger chamber and the reservoir vessel with each other, and when the plunger is operated to advance for discharging the liquid from the plunger chamber, the switching valve communicates the plunger chamber and the nozzle with each other.

By communicating the reservoir vessel and the switching valve with each other through a liquid feed tube, a liquid reservoir section and a delivery mechanism section can be provided separately from each other, and therefore the reservoir vessel can be disposed in a place convenient for handling. For example, when the amount of liquid remaining in the reservoir vessel becomes small, it is possible to easily carry out work of replenishing the liquid into the reservoir vessel or for replacing the reservoir vessel itself with another one in which the liquid is filled in advance. Further, since the amount of liquid reserved in the reservoir vessel can be set to an appropriate amount according to a schedule in consideration of the pot life of the liquid used and the quantity of work per day, the work schedule per day can be designed so as to eliminate the work of replenishing the liquid or to replenish the liquid into the reservoir vessel as required.

Moreover, by communicating the nozzle and the switching valve with each other through a liquid feed tube, the delivery mechanism section and a delivery port can be disposed separately from each other. Therefore, since the work can be performed with the delivery mechanism section installed on a stationary part and the nozzle mounted on a moving part, e.g., a robot, it is possible to construct the moving part at very light weight. As a result, the coating work, for example, the work of drawing a desired pattern on the surface of a workpiece by coating the liquid thereon, can be performed at very high speed.

When the liquid in the reservoir vessel is a highly viscous fluid, or when the liquid requires to be more quickly sucked into the plunger chamber, the delivering device preferably includes a pressurizing unit for pressurizing the liquid in the reservoir vessel to assist the suction force caused upon the retreat of the plunger so that the liquid in the reservoir vessel is supplied to the plunger chamber under pressure.

The switching valve can be constituted as a sliding switching valve. Preferably, the switching valve is a slide valve which includes a valve block provided with a first flow channel communicating with the reservoir vessel and a second flow channel communicating with the nozzle, and which slides to switch over the respective flow channels for communication between the relevant sections. As the distance between the first flow channel and the second flow channel disposed adjacent to each other is reduced, a loss time caused with the switching operation can be cut down and the liquid can be delivered in a shorter tact time.

The drive means and/or the switching valve can be operated in accordance with a signal from a control section. Preferably, in the delivering operation, the switching valve is controlled to communicate the plunger with the nozzle, and the drive means is controlled to pressurize the liquid. Also, in the sucking operation, the switching valve is controlled to communicate the plunger with the reservoir vessel, and the drive means is controlled to suck the liquid.

The plunger can be disposed in plural number. The provision of plural plungers enables plural cycles of delivery to be performed by different plungers used in turn in each delivery cycle. More specifically, by operating another plunger to such the liquid or stopping the operation of that plunger when any one of the plural plungers performs the delivering operation, the plunger having sucked the liquid can quickly deliver the sucked liquid in the next delivery cycle. It is therefore possible to effectively save the time required for sucking the liquid and to realize a shorter tact time.

Further, the drive means can be provided in the same number as that of the plungers.

In addition, the plungers can be controlled independently of each other. With this control, the plunger speed of the delivering operation plunger, at which one of the plungers delivers the liquid, and the plunger speed of the sucking operation plunger, at which another plunger sucks the liquid into the plunger chamber, can be easily adjusted to different speeds from each other. This is preferable in that when one of the plural plungers is used to delivery the liquid, the one plunger can be operated at a speed suitable for the delivery, and when another plural plunger is used to suck the liquid, it can be operated at a speed suitable for the suction.

Moreover, the liquid delivering device of the present invention comprises a nozzle for delivering a liquid, a reservoir vessel for reserving the liquid, a plunger pump, drive means for driving the plunger pump, and a switching valve for communicating a plunger chamber with the reservoir vessel or the nozzle, the device being characterized in that a cylinder block constituting the plunger pump and a valve block constituting the switching valve are disposed in a close and slide contact with each other. Stated another way, a pump section and a valve section are disposed in an intimately joined relation, and when a fore end of the plunger is positioned on a plane where the cylinder block and the valve block join with each other, the suction is started and the delivery is completed. The necessary least amount of liquid can be therefore pressurized without compressing an excessive amount of liquid. As a result, the delivery of the liquid can be controlled at a high response and hence the liquid can be delivered at a high tact. In addition, since the fore end position of the plunger is always kept the same in each delivery cycle, the liquid can be delivered with high precision.

Thus, the operations of discharging and sucking the liquid are switched over in cooperation of advance or retreat of the plunger as a component of the pump section with corresponding movement of the valve block as a component of the valve section. More specifically, when the valve block as a component of the valve section is located in a position where the pump section and a liquid reservoir section are communicated with each other, the plunger is retreated to a position corresponding to the amount of liquid to be delivered, thereby causing the liquid to move from the reservoir vessel into the plunger chamber. Then, the plunger is advanced to a position from which it has started to retreat, thereby delivering the liquid through a fore end of the nozzle. On that occasion, the position where the fore end of the plunger is located at the time of starting the retreat and at the time of completing the delivery is defined on a plane where the cylinder block and the valve block join with each other.

Herein, a liquid is, though just slightly, compressive and a liquid volume is reduced when it is pressurized. In other words, a liquid must be compressed in order to pressurize the liquid. Also, the larger the amount of liquid to be pressurized, the more difficult is it to increase the liquid pressure more quickly. For example, as the amount of liquid to be pressurized increases in the liquid delivering device of the present invention, the moving speed of the plunger must be increased to ensure the identical pressure increasing process. Conversely speaking, when the amount of liquid to be compressed is small, the liquid pressure can be increased with a smaller amount by which the plunger is advanced and retreated. Accordingly, by setting the position where the fore end of the plunger is located at the time of starting the retreat and at the time of completing the delivery to locate on the plane where the cylinder block and the valve block join with each other, an extra liquid is avoided from being left in the plunger chamber and the amount of pressurized liquid can be kept at the necessary least amount.

Also, since pressure is applied to act upon the necessary least amount of liquid, the liquid is delivered through the fore end of the nozzle exactly in response to the operation of the plunger. It is therefore possible to prevent, for example, a phenomenon that the liquid continues to drip from the delivery port of the nozzle in spite of the plunger being stopped after the completion of delivery. As a result, a delay of the completion of delivery and liquid dripping can be eliminated which are otherwise caused upon expansion of the compressed liquid, and the delivery of the liquid can be controlled at a high response.

Further, by setting the liquid suction start position and the liquid delivery end position of the plunger fore end to be always constant as described above, the amount of pressurized liquid residing in an area from the plunger fore end to the nozzle fore end is also held constant, and so is the amount by which a pressure buffer is compressed. Consequently, the amount of liquid delivered in each cycle is stabilized and the liquid can be delivered with high precision.

In addition, since one delivery cycle is performed by one advance stroke of one plunger, the liquid delivered through the nozzle fore end is subjected to no pulsation. Moreover, since the liquid sucked into the plunger chamber is all discharged out of the plunger chamber, there is no liquid residing near the plunger and hence the liquid residing over a long time is prevented from changing its properties in the plunger chamber. Taking an adhesive as an example, it is possible to avoid a trouble that the adhesive is hardened and the plunger is seized.

Operation

The operations of discharging and sucking the liquid are switched over in cooperation of advance or retreat of the plunger as a component of the pump section with corresponding movement of the valve block as a component of the valve section. More specifically, when the valve block is located in a position where the pump section and the liquid reservoir section are communicated with each other, the plunger is retreated to a position corresponding to the amount of liquid to be delivered, thereby sucking the liquid from the reservoir vessel into the plunger chamber in the amount to be delivered. Then, after moving the valve block to a position where the pump section and the nozzle section are communicated with each other, the plunger is advanced to a position from which it has started to retreat, thereby delivering the liquid through the fore end of the nozzle. On that occasion, the position where the fore end of the plunger is located at the time of starting the retreat and at the time of completing the delivery is defined on a plane where the cylinder block and the valve block join with each other.

Thus, by setting the position where the fore end of the plunger is located at the time of starting the retreat and at the time of completing the delivery to locate on the plane where the cylinder block and the valve block join with each other, an extra liquid is avoided from being left in the plunger chamber and the amount of pressurized liquid can be kept at the necessary least amount.

Also, since pressure is applied to act upon the necessary least amount of liquid, the liquid is delivered through the fore end of the nozzle exactly in response to the operation of the plunger. It is therefore possible to prevent, for example, a phenomenon that the liquid continues to drip from the delivery port of the nozzle in spite of the plunger being stopped after the completion of delivery. As a result, a delay of the completion of delivery and liquid dripping can be eliminated which are otherwise caused upon expansion of the compressed liquid, and the delivery of the liquid can be controlled at a high response.

Further, by setting the liquid suction start position and the liquid delivery end position of the plunger fore end to be always constant as described above, the amount of pressurized liquid residing in an area from the plunger fore end to the nozzle fore end is also held constant, and so is the amount by which a pressure buffer is compressed is further held constant. Consequently, the amount of liquid delivered in each cycle is stabilized and the liquid can be delivered with high precision.

In addition, since one delivery cycle is performed by one advance stroke of one plunger, the liquid delivered through the nozzle fore end is subjected to no pulsation.

Moreover, since the liquid sucked into the plunger chamber is all discharged out of the plunger chamber, there is no liquid residing near the plunger and hence the liquid residing over a long time is prevented from changing its properties in the plunger chamber. Taking an adhesive as an example, it is possible to avoid a trouble that the adhesive is hardened and the plunger is seized in the plunger chamber.

As mentioned above, the pump section and the valve section are disposed in an intimately joined relation, and when the fore end of the plunger is positioned on the plane where the cylinder block and the valve block join with each other, the suction is started and the delivery is completed. Therefore, the necessary least amount of liquid can be pressurized without compressing an excessive amount of liquid. As a result, the delivery of the liquid can be controlled at a high response and hence the liquid can be delivered at a high tact.

Further, since the fore end position of the plunger is always kept the same in each delivery cycle, the liquid can be delivered with high precision.

It is needless to say that, in the present invention, the control means can perform the suckback operation by adjusting the stop position of the plunger.

Details of the present invention will be described in connection with embodiments. It is to be noted that the present invention is in no way limited by the embodiments described below.

Embodiment 1

Figure 1:
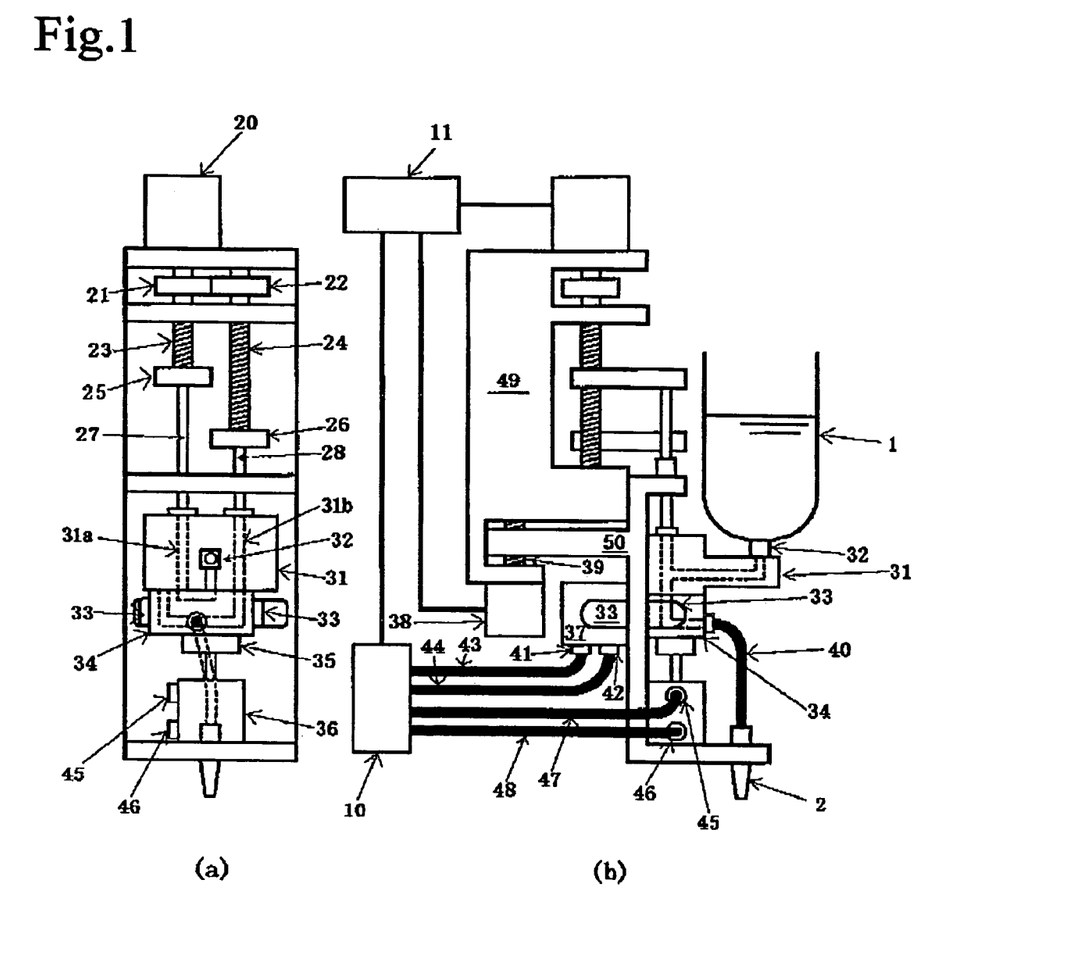
FIG. 1 is a schematic view of Embodiment 1.

One embodiment of the present invention will be described with reference to FIGS. 1 and 2.

In the Figures, numeral 31 denotes a cylinder block which is made of a block-shaped metal material and has cylindrical penetration holes bored in it to form a plunger chamber A 31$a$ and a plunger chamber B 31$b$. A plunger rod A 27 and a plunger rod B 27 are fitted respectively in the plunger chamber A 31$a$ and the plunger chamber B 31$b$ to be able to advance and retreat therein. The stroke of each plunger rod is set such that a front end surface of the plunger rod in its maximum advance position is flush with one side surface of the cylinder block 31. A valve block 34 is disposed in close and slide contact with one side surface of the cylinder block 31 at which the penetration holes formed in the cylinder block 31 are opened. The valve block 34 is also held in pressure contact with the cylinder block 31 by a pushing member 35 so that a liquid is prevented from leaking through the interface between both the blocks.

Figure 2:
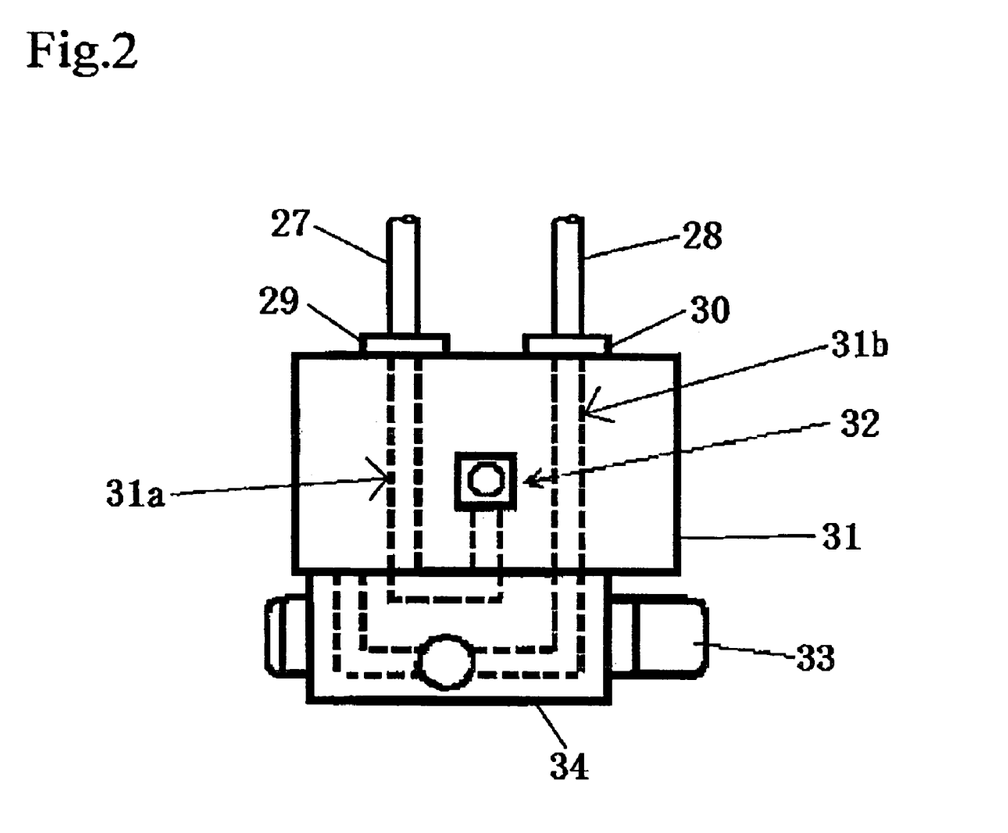
FIG. 2 is an enlarged view of principal part of Embodiment 1.

Additionally, numerals 29, 30 in FIG. 2 denote seals for preventing leakage of the liquid through contact surfaces between the cylinder block and the plunger rod.

Flow channels are formed in the valve block 34, as shown, to constitute a slide valve in cooperation with the cylinder block 31. The slide valve opens and closes flow channels between a reservoir vessel 1 and a nozzle 2 to control the liquid supplied to the nozzle 2. Also, a portion of a surface of the valve block 34 held in pressure contact with the cylinder block 31, in which the flow channels are not opened, functions as a cylinder head. More specifically, the slide valve is constituted by both the valve block 34 and the cylinder block 31. Then, the valve block 34 slides relative to the cylinder block 31 to perform the flow-channel switching operation in accordance with a signal from an air control means 10 such that the plunger chamber B 31b is communicated with the nozzle 2 when the plunger chamber A 31a is communicated with the reservoir vessel 1, and the plunger chamber B 31b is communicated with the reservoir vessel 1 when the plunger chamber A 31a is communicated with the nozzle 2.

Further, because the valve block 34 is held in a pressure contact state between the pushing member 35 and the cylinder block 31, it is preferable for the purpose of ensuring smooth sliding of the valve block 34 that contact surfaces of the valve block 34 with the pushing member 35 and the cylinder block 31 each have a low coefficient of friction. In practice, the low coefficient of friction can be realized by reducing the area of each of those contact surfaces.

A motor A 20 is connected to a ball screw A23 through a gear A 21.

The plunger rod A 27 is attached to a plunger-rod attachment plate A 25 such that it advances and retreats with rotation of the motor A 20 while slide-contacting with an inner surface of the plunger chamber A 31a.

The plunger rod B 28 is attached to a plunger-rod attachment plate B 26 such that it advances and retreats with rotation of the ball screw B 24 while slide-contacting with an inner surface of the plunger chamber B 31b. A gear B22 coupled to the ball screw B24 is coupled to the gear A 21. With such a gear arrangement, when the plunger rod A 27 advances, the plunger rod B 28 retreats, and when the plunger rod A 27 retreats, the plunger rod B 28 advances.

The pushing member 35 is provided at a fore end of an air cylinder A 36 and fixedly press the valve block 34 cylinder block in place with air pressure supplied from the air control means 10. Therefore, the valve block 34 is brought into close contact with the cylinder block 31 and the pushing member 35 so as to prevent useless leakage of the liquid, while allowing the valve block 34 to slide relative to the cylinder block 31 and the pushing member 35.

By always supplying a constant air pressure force from the air control means 10, the pushing member 35 provided at the fore end of the air cylinder A 36 can bring the valve block 34 into close contact with the cylinder block 31 under a desired force at all times. It is not preferable to use a spring or the like to apply the pressing force, because the use of a spring or the like causes changes in the force for pressing the valve block 34 due to, e.g., deterioration and deformation of a spring material, etc.

Further, the use of the air cylinder A 36 is advantageous in the following point. Even if the contact surfaces of the valve block 34 and the cylinder block 31 are worn off and the effective width of the valve block 34 is reduced, the air pressure regulated so as to provide the constant pressing force is supplied to the air cylinder A 36, and therefore the valve block 34 can be brought into pressure contact with the cylinder block 31 under the force of the same magnitude as that applied before wearing of the contact surfaces. It is hence possible to avoid a gap being formed between the contact surfaces of the valve block 34 and the cylinder block 31, and to prevent the liquid from leaking uselessly.

The air cylinder A 36 may be provided with a stopper for preventing retraction of the air cylinder A 36 and keeping the valve block 34 and the cylinder block 31 from being separated from each other, when the valve block 34 is subjected to a force acting to move it away from the cylinder block 31.

The valve block 34 is slidable parallel to the contact surface of the cylinder block 31 and the position of the valve block 34 is controlled such that the plunger chamber B 31b is communicated with the reservoir vessel 1 when the plunger chamber A 31a is communicated with the nozzle 2, and the plunger chamber B 31b is communicated with the nozzle 2 when the plunger chamber A 31a is communicated with the reservoir vessel 1.

Such a sliding operation of the valve block 34 can be performed by the air control means 10 controlling an air cylinder B 37.

Two valve block support arms 33 are connected to both ends of the air cylinder B 37, and the valve block 34 is formed to have a width equal to the distance between those two arms. The sliding operation of the valve block 34 is performed with the valve block 34 held between the two support arms 33.

The valve block 34 is merely fixedly pressed against the two valve block support arms 33 connected to the air cylinder B 37 and the pushing member 35 connected to the air cylinder A 36 without being fixed to them by bonding. By cutting off the supply of pressure to the air cylinder A 36 and reducing the pressing force of the pushing member 35 against the valve block 34, therefore, the valve block 34 can be simply removed and easily replaced with a new one when the valve block 34 is worn out.

A motor B 38 is coupled to a ball screw C 39. With rotation of the motor B 38, the relative distance between a base block 49 and a sub-block 50 can be changed in the axial described of the ball screw C 39.

The motor A 20, the ball screw A 23, the ball screw B 24, the plunger rod A 27, the plunger rod B 28, the plunger-rod attachment plate A 25, and the plunger-rod attachment plate B 26 are each fixed to the base block 49. The plunger chamber A 31a, the plunger chamber B 31b, the cylinder block 31, the nozzle 2, and the valve block 34 are each fixed to the sub-block 50. By changing the relative distance between the base block 49 and the sub-block 50 with rotation of the ball screw C 39, therefore, the relative distances from the plunger rod A 27 and the plunger rod B 28 to the valve block 34 can be adjusted while the relative distance between the plunger rod A 27 and the plunger rod B 28 is kept constant. Accordingly, when each of the plunger rods is just slightly displaced, for example, in the case of delivering a small amount of liquid, the plunger rod position can be set closer to the valve block 34. It is hence possible to effectively avoid the liquid from remaining uselessly.

Assuming that the middle of a maximum stroke through which each plunger rod advances and retreats is defined as a position where a fore end of the plunger rod A 27 and a fore end of the plunger rod B 28 are aligned with each other, when the liquid is delivered in such an amount as not requiring movement of the plunger rod through the maximum stroke, for example, in the case of delivering a small amount of liquid, the plunger rod is operated to advance and retreat just through a shorter stroke than the maximum stroke. On that occasion, the liquid remaining between the fore end position of the plunger rod and the valve block 34 at the time of end of the delivery acts as a buffer. Accordingly, it is preferable to eliminate the liquid acting as a buffer, in particular, when the liquid is delivered at a high tact.

The liquid can be replenished into the reservoir vessel 1 as the occasion requires. Also, the reservoir vessel 1 may be replaced with another one in which the liquid is filled in advance.

The air cylinder A 36 and the air cylinder B 37 are both connected to the air control means 10 and are able to supply air as required. Further, the air control means 10, the motor A 20, and the motor B 38 are connected to a control unit 11 and operated in accordance with signals from the control unit 11.

The delivering operation is carried out as follows:

(1) The plunger rod A 27 and the plunger rod B 28 are adjusted such that their fore ends are located in positions (aligned positions) at equal distances from the cylinder block. Each of those positions is called a base position.

(2) The motor A 20 is driven to advance the plunger rod A 27 by a stroke corresponding to a volume that is equal to a half of the desired delivery amount. At this time, the rotation of the motor A 20 is transmitted to the gear B 22 through the gear A 21, thus causing the plunger rod B 28 to retreat by a stroke corresponding to the volume that is equal to a half of the desired delivery amount.

(3) The advance amount of the plunger rod A 27 from the base position in the above state is a maximum stroke when the desired amount of liquid is delivered. Hence, the motor B 38 is driven to move the fore end position of the plunger rod A 27 closer to the valve block 34, whereby the relative distance between the base block 49 and the sub-block 50 is adjusted so that the amount of liquid remaining in the plunger chamber A 31a is minimized, preferably, becomes zero.

Because the plunger rod A 27 and the plunger rod B 28 are translated in union with each other with driving of the motor B 38, the relative distance between the plunger rod A 27 and the plunger rod B 28 remain the same.

(4) At this point, the position of the valve block 34 is adjusted to communicate the reservoir vessel 1 and the plunger chamber A 31a with each other, i.e., to communicate the nozzle 2 and the plunger chamber B 31b with each other.

(5) Then, the motor A 20 is driven to advance the plunger rod B 28 by a stroke corresponding to the desired volume of delivered liquid. At the same time, with the rotation of the motor A 20, the plunger rod A 27 retreats by a stroke corresponding to the desired volume of delivered liquid, whereupon the liquid in the reservoir vessel 1 is sucked into the plunger chamber A 31a.

(6) Furthermore, the position of the valve block 34 is adjusted to communicate the reservoir vessel 1 and the plunger chamber B 31b with each other, i.e., to communicate the nozzle 2 and the plunger chamber A 31a with each other.

(7) The motor A 20 is driven to advance the plunger rod A 27 by a stroke corresponding to the desired volume of delivered liquid. Since the desired amount of liquid is already filled in the plunger chamber A 31a, the liquid is delivered through a delivery port at the fore end of the nozzle 2 with the driving of the motor A 20. Also, since the reservoir vessel 1 and the plunger chamber B 31b are communicated with each other and the plunger rod B 28 retreats by a stroke corresponding to the desired volume of delivered liquid with the rotation of the motor A 20 at the same time, the liquid in the reservoir vessel 1 is sucked into the plunger chamber B 31b.

(8) Subsequently, the liquid is successively delivered by repeating the operations of above 4 to 7.

Thus, at the same time when the liquid is delivered upon advance of one of the plunger rods, the other plunger rod sucks the liquid into the corresponding plunger chamber. As a result, the delivering operation can be performed at a high tact.

Embodiment 2

Figure 3:
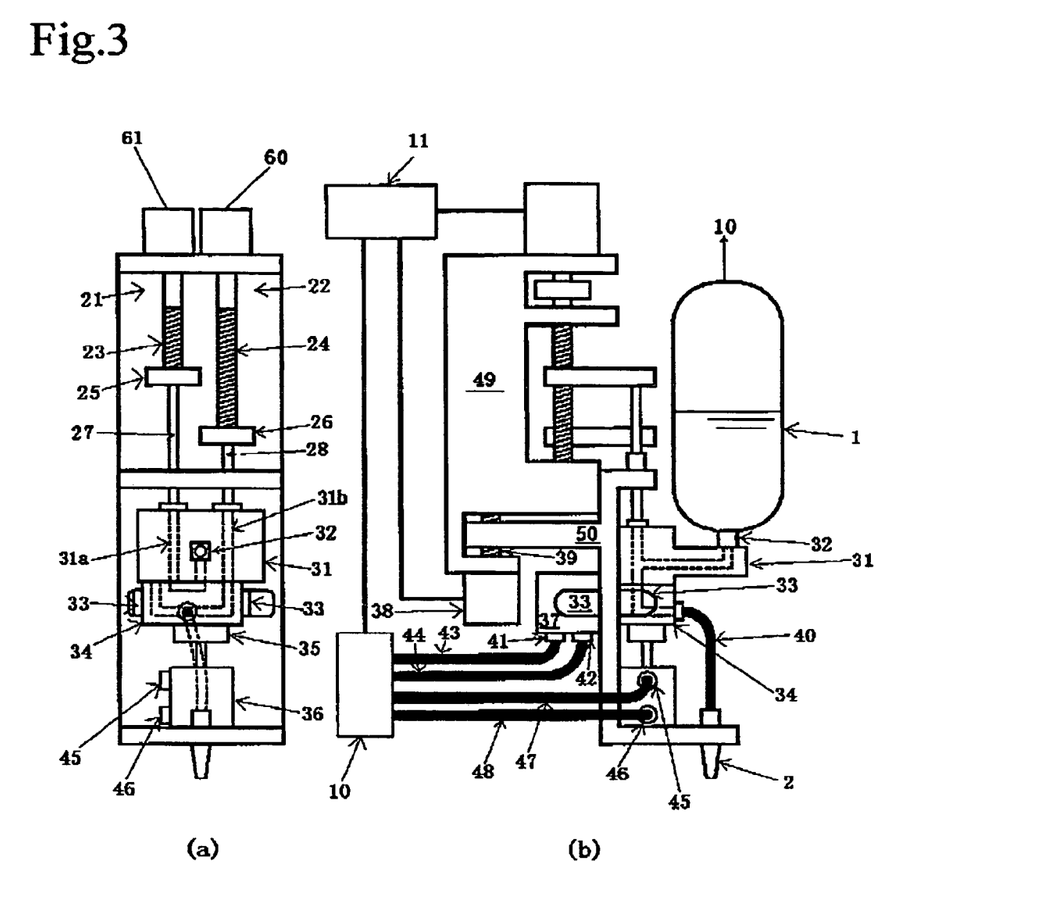
FIG. 3 is a schematic view of Embodiment 2.

In above Embodiment 1, two plunger rods are driven by one motor. In this embodiment, however, two motors 60, 61 are connected respectively to two plunger rods 27, 28, and an air pressure is applied to the liquid in the reservoir vessel 1 so that the liquid can be quickly filled into the plunger chambers A 31a, B 31b from the reservoir vessel 1. Main features of this embodiment are as follows.

(1) The motors 60, 61 are connected respectively to two ball screws 23, 24, and therefore the two plunger rods 27, 28 can be moved independently of each other. This arrangement enables the speeds of delivery and suction to be changed as required. For a liquid requiring a longer time to suck it, therefore, the filling speed can be reduced without changing the delivery speed, and the occurrence of cavitation can be suppressed without causing an inadequate suction force to act upon the liquid.

(2) By rotating the two independent motors 60, 61 in the same direction, the relative distances from the plunger rod A 27 and the plunger rod B 28 to the valve block 34 can be adjusted while the relative distance between the plunger rod A 27 and the plunger rod B 28 is kept constant. In Embodiment 2, therefore, it is no longer required to provide the base block and the sub-block separately from each other and to slide the sub-block by the motor, as shown in FIG. 3.

(3) The air control means 10 is able to pressurize air in the reservoir vessel 1 so that the liquid can be quickly sucked into the plunger chambers A 31a, B 31b from the reservoir vessel 1. Accordingly, the liquid can be supplied to the plunger chambers at higher speed and the delivering operation can be performed at a shorter tact time. This feature is particularly much effective in the case of delivering a highly viscous liquid. In the present invention, the reservoir vessel and the cylinder block may be communicated with each other through a liquid feed tube. With such a modification, the reservoir vessel can be installed in a position remote from the device body, and hence the reservoir vessel can be easily replaced with a new one even when the device body is installed in apposition beyond the range easily accessible by a worker. Likewise, the valve block and the nozzle may be communicated with each other through a liquid feed tube.

Embodiment 3

Figure 4:
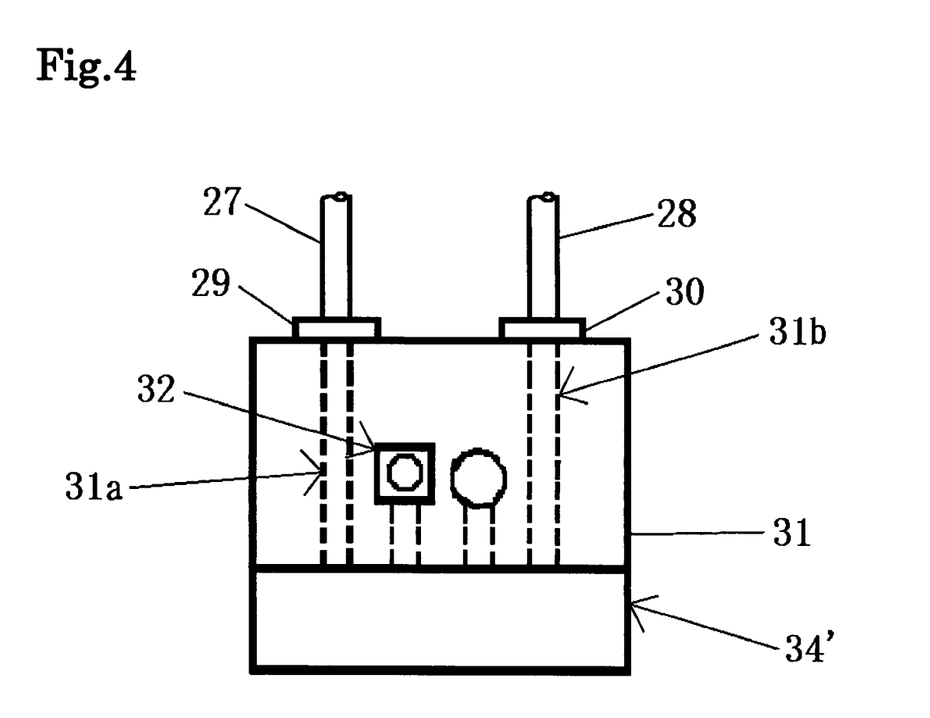
FIG. 4 is a schematic view of Embodiment 3.

FIG. 4 illustrates Embodiment 3. While above Embodiments 1 and 2 employ, as the switching valve, a sliding switching valve, in this embodiment the switching valve block 34 has a rotary switching valve having a smooth sliding surface. More specifically, a disk-like valve body having an arc-shaped flow channel formed in its surface held in contact with the cylinder block is rotated in one direction or reciprocally. Under cooperation of the arc-shaped flow channel formed in the disk-like valve body with a hole formed in the surface of the cylinder block held in close contact with the valve block and communicating with a pump section, a hole formed in that close contact surface and communicating with the liquid reservoir vessel, and a hole formed in that close contact surface and communicating with the nozzle, the switching valve performs the switching operation between a state in which the pump section is communicated with the liquid reservoir vessel and a state in which the pump section is communicated with the nozzle, as in Embodiment 1 or 2.

Any of the above embodiments has been described as including two pump sections. However, the present invention can also be constructed such that only one pump section is provided and the liquid flow channel is switched over to communicate the plunger chamber and the liquid reservoir vessel with each other or to communicate the plunger chamber and the nozzle with each other.

Further, the above embodiments employ the plunger chambers directly bored in the cylinder block, but the plunger chambers can be formed by boring a fitting hole in the cylinder block and fitting a separate cylinder to the fitting hole. In addition, it is possible to use, as the cylinder block, a material that is relatively easy to machine, to form the plunger chamber by fitting the separate cylinder to the fitting hole bored in the cylinder block, and to employ a hard member to form a sliding surface of the cylinder block held in close contact with the valve section.

Additionally, even in the case in which the plunger chambers are directly formed in the cylinder block, the sliding surface of the cylinder block held in close contact with the valve section may be formed of a hard member because the contact surface of the cylinder block with the valve section is heavily worn.

INDUSTRIAL APPLICABILITY

As described above, since the pump section and the valve section are disposed in an intimately joined relation, and the maximum advance position of a plunger is defined by a plane where a fore end surface of the plunger contacts the valve section and the pump section, the necessary least amount of liquid can be pressurized without compressing an excessive amount of liquid. Accordingly, delivery of the liquid can be controlled at a high response and hence the liquid can be delivered at a high tact.

Further, since the fore end position of the plunger is always kept the same in each delivery cycle, the liquid can be delivered with high precision.

The invention claimed is:

1. A device for delivering a fixed quantity of liquid, comprising:
a pump section for metering the delivered liquid to provide a desired amount, said pump section including a cylinder block having a penetration hole to form a plunger chamber, a plunger reciprocating in said plunger chamber and a motor for moving said plunger by a desired stroke;
a valve section for switching between liquid flow channels for suction and delivery;
a reservoir section for reserving the liquid and being communicable with said pump section depending upon the position of said valve section;
a delivery section having a delivery port for delivering the liquid; and
a control section for operating the plunger so that one delivery cycle is carried out by one sucking operation and one discharging operation of the plunger,
wherein said valve section is slidingly connected to said pump section, and a maximum advance position of said plunger at the time of completing the delivery of one delivery cycle is controlled by a position where a fore end surface of said plunger contacts an end of said penetration hole, and
wherein said valve section includes a slide valve brought into close contact with said cylinder block under action of air pressure.

2. A device for delivering a fixed quantity of liquid according to claim 1, wherein said valve section is installed removably from said pump section.

3. A device for delivering a fixed quantity of liquid according to claim 1, wherein said plunger chamber is defined by a cylindrical member fitted in a hole bored in said cylinder block.

4. A device for delivering a fixed quantity of liquid according to claim 1, wherein said valve section is in the form of a switching valve including a valve block provided with a first flow channel communicating with said reservoir section and a second flow channel communicating with said delivery section.

5. A device for delivering a fixed quantity of liquid according to claim 1, wherein said switching valve is a sliding switching valve.

6. A device for delivering a fixed quantity of liquid according to claim 1, wherein said switching valve is a rotary switching valve having a smooth sliding surface.

7. A device for delivering a fixed quantity of liquid according to claim 1, wherein said device includes pressurizing means for pressurizing the liquid in a reservoir vessel.

8. A device for delivering a fixed quantity of liquid according to claim 1, wherein a plurality of plungers constituting said pump sections are driven by one drive source.

9. A device for delivering a fixed quantity of liquid according to claim 8, wherein the control section operates another plunger to suck the liquid when any one of the plural plungers performs the delivering operation.

10. A device for delivering a fixed quantity of liquid according to claim 1, wherein said device includes a plurality of pump sections, and a plurality of plungers constituting said pump sections are driven by drive sources independent of each other.

11. A device for delivering a fixed quantity of liquid according to claim 10, wherein the control section operates another plunger to suck the liquid when any one of the plural plungers performs the delivering operation.

12. A device for delivering a fixed quantity of liquid according to claim 1, one drawing line is drawn by one sucking operation and one discharging operation of the plunger.

13. A device for delivering a fixed quantity of liquid according to claim 1, wherein said control section retreats said plunger by a stroke corresponding to the desired volume of delivered liquid.

14. A device for delivering a fixed quantity of liquid according to claim 13, further comprising a pushing member for holding said valve block in pressure contact with said cylinder block.

15. A device for delivering a fixed quantity of liquid, comprising:
a pump section for metering the delivered liquid to provide a desired amount, said pump section including a cylinder block having a penetration hole to form a plunger chamber, a plunger reciprocating in said plunger chamber and a motor for moving said plunger by a desired stroke;
a valve section for switching between liquid flow channels for suction and delivery, said valve section including a valve block having said liquid flow channels and a surface at which part of said liquid flow channels are disposed;

a reservoir section for reserving the liquid and being communicable with said pump section depending upon the position of said valve section;

a delivery section having a delivery port for delivering the liquid; and a control section for operating the plunger so that one delivery cycle is carried out by one sucking operation and one discharging operation of the plunger, wherein said surface of said valve block is disposed in close and slide contact with one side surface of said cylinder block at which said penetration hole is formed, and a maximum advance position of said plunger at the time of completing the delivery of one delivery cycle is controlled by a position where a fore end surface of said plunger contacts an end of said penetration hole, and wherein said valve section includes a pushing member for pressing said valve block with air pressure.

16. A device for delivering a fixed quantity of liquid according to claim 15, further comprising valve block support arms for holding said valve block such that the sliding operation of said valve block is performed.

17. A device for delivering a fixed quantity of liquid according to claim 15, wherein said control section retreats said plunger by a stroke corresponding to the desired volume of delivered liquid.

* * * * *